United States Patent [19]

Ito

[11] Patent Number: 4,831,568

[45] Date of Patent: May 16, 1989

[54] HANDWRITTEN-IMAGE INPUT APPARATUS

[75] Inventor: Takafumi Ito, Tokyo, Japan

[73] Assignee: Kabushiki Kaisha Toshiba, Kawasaki, Japan

[21] Appl. No.: 42,839

[22] Filed: Apr. 27, 1987

[30] Foreign Application Priority Data

Apr. 30, 1986 [JP] Japan ................................ 61-100749

[51] Int. Cl.[4] .......................................... G06F 15/626
[52] U.S. Cl. ........................... 364/709.11; 364/709.01; 364/521
[58] Field of Search ....................... 364/709, 518, 521; 340/706; 178/18; 382/13, 24, 3

[56] References Cited

U.S. PATENT DOCUMENTS

| 3,528,295 | 9/1970 | Johnson et al. | 382/3 |
| 4,365,235 | 12/1982 | Greanias et al. | 364/518 |
| 4,513,437 | 4/1985 | Chainer et al. | 382/3 |
| 4,514,818 | 4/1985 | Walker | 364/521 |

FOREIGN PATENT DOCUMENTS 58-195937 11/1983 Japan .
58-195938 11/1983 Japan .
61-59523 3/1986 Japan .

OTHER PUBLICATIONS

US Periodical: Hewlett-Packard Journal, Jan. 1981, pp. 17-18 Capacitive Stylus Design by Susan M. Cardwell.

Primary Examiner—Gary V. Harkcom
Assistant Examiner—Long T. Nguyen
Attorney, Agent, or Firm—Oblon, Fisher, Spivak, McClelland & Maier

[57] ABSTRACT

A handwritten-image input apparatus comprises a pen, a controller, a display device, and a tablet. The tablet detects the position of the pen thereon. The display device displays a trace made by the pen on the tablet, under the control of the controller. The pen includes a switch for detecting whether or not the pressure applied to the pen exceeds a predetermined value. When the switch is ON (when the pressure applied to the pen is greater than the predetermined value), the controller controls the display device to increase the line width of the trace, made by the pen, which is displayed on the display device. When the switch is OFF (when the pressure applied to the pen is less than the predetermined value), the controller controls the display device to decrease the line width of the trace, made by the pen, which is displayed on the display device. When the width of the displayed trace made by the pen reaches a predetermined value, the controller does not increase the line width any further.

13 Claims, 5 Drawing Sheets

HANDWRITTEN-IMAGE INPUT APPARATUS

BACKGROUND OF THE INVENTION

The present invention relates to (1) a system for detecting the trace made by the writing tip of a pen on a tablet, and displaying the trace while changing the line width of the trace in correspondence with the pressure applied to the writing tip of the pen, and to (2) a system for inputting a handwritten image to the system.

An image-processing apparatus using a computer is known. As an example of such an image-processing apparatus, a display system is known which has a function permitting the width of a handwritten line to be changed and displayed (see FIG. 3 in Japanese Patent Disclosure (Kokai) No. 61-59523). This particular system detects the actual pressure applied to a pen and displays a line width corresponding to the pressure. Consequently, the system has a complicated arrangement.

SUMMARY OF THE INVENTION

It is an object of the present invention to provide a simple display device which can change the line width of a pen trace in correspondence with the pressure applied to a pen, and a system for inputting handwritten image information to the display device.

In order to achieve the above object, a handwritten-image input apparatus according to the present invention comprises pen means (1), tablet means (4) for detecting the position of the pen means (1), means for detecting whether or not the pressure applied to the pen means (1) exceeds a predetermined value, and trace information-generating means (2), which receives information from the tablet means (4), indicating the position of the pen means (1), and information indicating the pressure being applied to the pen means, supplied from the pressure detecting means, and generates trace information for outputting a trace of the movement of the pen means (1), the trace information including line-width information indicating the width of the trace made by the pen means (1), the trace information-generating means changing the line-width information so as to increase the output line width of the trace made by the pen means (1) when the pressure applied to the pen means is greater than the predetermined value, and changing the line-width information so as to decrease the output line width of the trace made by the pen means when the pressure applied to the pen means (1) is less than the predetermined value.

With the above arrangement, the handwritten-image input apparatus according to the present invention can be simple in form, and a handwritten image having a line width corresponding to a change in writing pressure can be input to an image-processing apparatus.

DETAILED DESCRIPTION OF THE PREFERRED EMBODIMENTS

Figure 1:
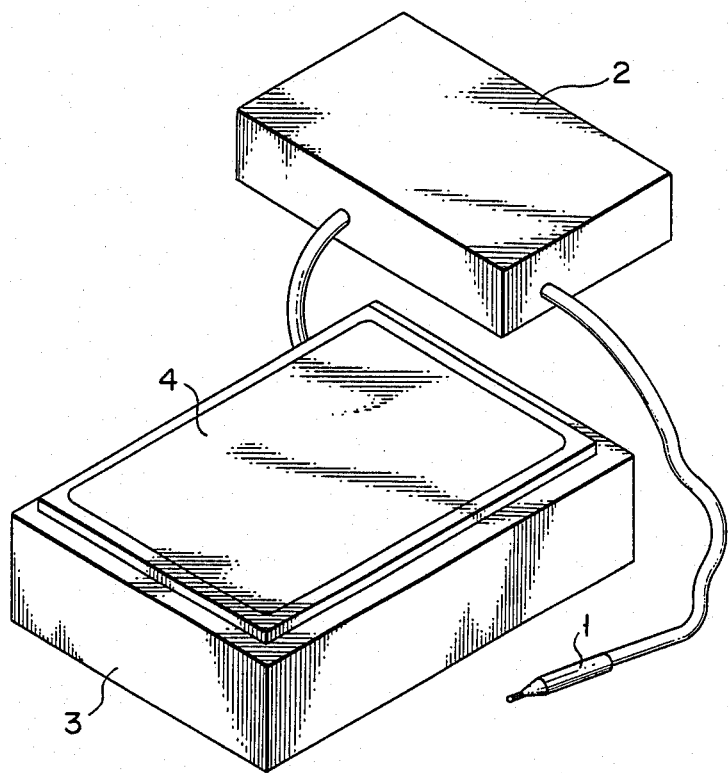
FIG. 1 is a perspective view showing an outer appearance of a handwritten-image input apparatus according to an embodiment of the present invention.

A handwritten-image input apparatus according to a first embodiment of the present invention will now be described, with reference to FIG. 1. Pen 1 for writing on a tablet is connected to controller 2. Tablet 4 is placed on display device 3, and comprises a transparent plate made of glass, acrylic resin, or the like. When the writing tip of pen 1 contacts tablet 4, tablet 4 detects the position of the writing tip, and supplies information relating to the position of the writing tip, to controller 2. Preferable methods for detecting the position of the writing tip of pen 1, by tablet 4, include a static induction method, a pressure method, and the like.

Display device 3 is located under transparent tablet 4, and displays an image under the control of controller 2. Display device 3 can comprise a CTT, a liquid crystal display device, a plasma display device, or the like. However, the present invention is not limited to this.

Pen 1 serves as an object whose position is detected by tablet 4. The structure of pen 1 will now be described with reference to FIG. 2.

Figure 2:
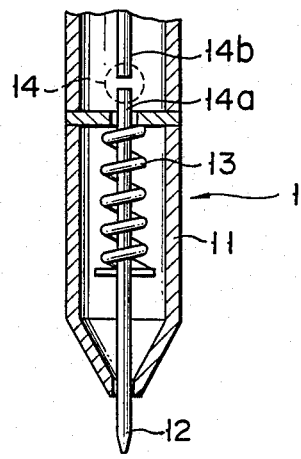
FIG. 2 is a partial cutaway sectional view of a pen, for explaining the structure of the pen shown in FIG. 1.

FIG. 2 is a partial cutaway view of pen 1. Switch 14 (electrodes 14a and 14b) is arranged in pen casing 11. When a pressure is applied to writing tip 12, tip 12 is pressed inside pen casing 11. When the pressure applied to writing tip 12 reaches a predetermined value, switch 14 is turned on (i.e., electrodes 14a and 14b are brought into contact with each other). Information associated with the ON/OFF operation of switch 14 is supplied to controller 2 via a cable.

Figure 3:
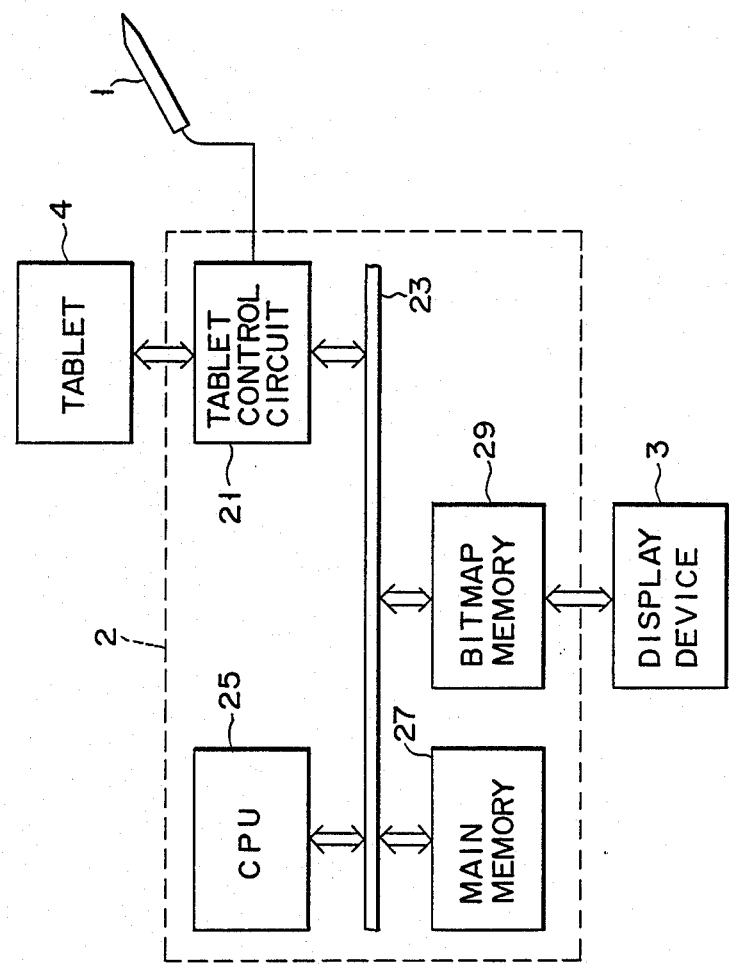
FIG. 3 is a block diagram showing a circuit arrangement of the handwritten-image input apparatus shown in FIG. 1.

An electrical arrangement of the apparatus according to this embodiment will be described hereinafter, with reference to FIG. 3.

Tablet 4 is connected to tablet control circuit 21. Tablet control circuit 21 controls the operation of tablet 4, e.g., the detection of the position of writing tip 12 at a predetermined cycle. Tablet control circuit 21 is connected to bus 23, as is CPU 25. CPU 25 controls the overall apparatus. Main memory 27 is also connected to bus 23. Main memory 27 comprises, for example, a ROM, and stores a program for controlling the operation of CPU 25. Main memory 27 stores a plurality of patterns shown in FIG. 5. The patterns are figures analogous to each other and are basic patterns of characters written by a Chinese writing brush. The patterns are numbered in order of size, and the smallest pattern has no area. Image memory 29 is a bit map memory, and is connected to bus 23. CPU 25 writes bit data "1" at locations of bit map memory 29 corresponding to pixels to be displayed on display device 3. Bit map memory 29 is also connected to display device 3. Tablet control circuit 21, bus 23, CPU 25, main memory 27, and bit map memory 29 are arranged in tablet controller 2.

The operation of the image display apparatus wit the above arrangement will now be described, with reference to the flow chart shown in FIG. 4.

Control remains in a loop constituted by step S1 and step S6 until table 4 detects the position of writing tip 12. When YES in step S1, i.e., when it is detected that the position of writing tip 12 has been detected, control advances to step S2. Control checks in step S2 whether switch 14 is ON or OFF. If switch 14 is OFF, control advances to step S3 (the operation in step S3 and the subsequent steps will be described later).

If it is detected in step S2 that switch 14 is ON, control advances to step S4. It is checked in step S4 if a maximum pattern number is set in a pattern register (not shown). Note that in an initial state, a minimum pattern number is set in the pattern register. More specifically, the pattern register stores one of the pattern numbers of the patterns shown in FIG. 5, and control checks if the pattern number stored therein is a maximum number. (In other words, it is checked if the largest pattern is written in memory 29 during the immediately preceding loop.) If the maximum pattern number is set in the pattern register, control advances to step S5. In step S5, CPU 25 writes a pattern corresponding to the number set in the pattern register (in this case, the largest pattern), at a location corresponding to the position of writing tip 12 detected by tablet 4. (More specifically, bit data "1" is stored at the corresponding location.) Memory 29 stores the same pattern as that displayed on display device 3. CPU 25 interpolates a gap between the currently written pattern and an immediately preceding written pattern. Control then advances to step S6 to check if the write access is completed. If the write access is not completed, control returns to step S1, and remains in a loop constituted by steps S1 and S6 until tablet 4 detects the position of writing tip 12.

Figure 6C:
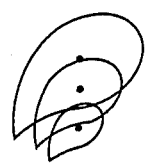
FIGS. 6A, 6B, 6C are representations for explaining an example of a method of interpolating patterns.
Figure 6B:
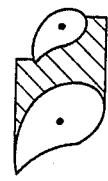
Figure 6A:

If it is detected in step S4 that the maximum pattern number is not set in the pattern register, control advances to step S7. In step S7, CPU 25 increments by one the pattern number set in the pattern register. (More specifically, CPU 25 selects a pattern larger, by one size, than a pattern written in memory 29 in the immediately preceding loop.) In step S8, the updated pattern number is set in the pattern register. (The pattern number stored in the pattern register is used for decision in step S4.) Control advances to step S5, and the selected pattern is written at a location of memory 29 corresponding to writing tip 12. For example, as is shown in FIG. 6A, a gap between the currently written pattern and a pattern written in the immediately preceding loop is interpolated.

If it is determined in step S2 that switch 14 is OFF, control advances to step S3. It is checked in step S3 if the pattern number set in the pattern register is a minimum number. If NO in step S3, control advances to step S9. In step S9, control decrements by one the pattern number stored in the pattern register. In step S10, the updated pattern number is set in the pattern register. Control advances to step S5, and the selected pattern is written at a location of memory 29 corresponding to writing tip 12. For example, as is shown in FIG. 6B, a gap between the currently written pattern and a pattern written in the immediately preceding loop is interpolated.

If it is detected in step S3 that the minimum pattern number is set in the pattern register, control advances to step S5. In step S5, since the area of the smallest pattern is "0", CPU 25 writes no data in memory 29, and control advances to step S6.

Display device 3 also incorporates a CPU (not shown). This CPU reads out data stored in bit map memory 29, independently of the operation of CPU 25, and displays an image. One bit of memory 29 corresponds to one pixel of display device 3. (However, the present invention is not limited to this.)

Figure 7A:
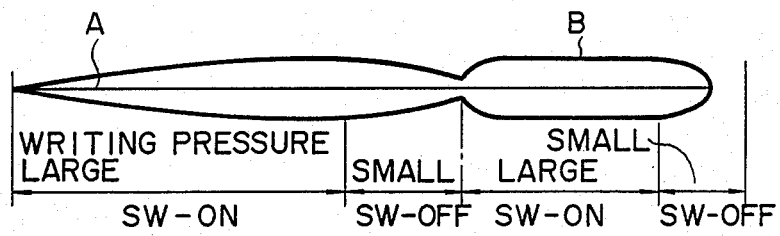
FIGS. 7A and 7B are graphs showing the relationship among a pen trace, a displayed image, writing pressure, an ON/OFF operation of a switch, and the moving speed of the pen, for the purpose of explaining in more detail, the operation shown in the flow chart of FIG. 4.
Figure 7B:
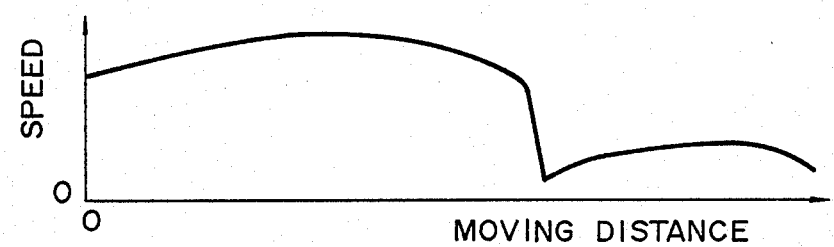

The practical operation of the image display apparatus according to the first embodiment of the present invention will now be described, with reference to FIGS. 7A and 7B. FIG. 7A shows the relationship among an actual trace of writing tip 12 on tablet 4 (line A); a pen trace displayed on display device 3 (a portion surrounded by curve B and equivalent to a figure in a location of memory 29 at which data "1" is stored); the pressure applied to writing tip 12; and the ON/OFF operation of switch 14. FIG. 7B shows the moving speed of writing tip 12. As indicated by line A in FIG. 7A, when an image is drawn on tablet 4 by pen 1, if a writing pressure exceeds a predetermined value, switch 14 is turned on. CPU 25 controls the system through the loop shown in steps S1, S2, S4, S7, S8, S5, and S6 of the flow chart in FIG. 4. As pen 1 moves, the patterns whose sizes are gradually increased accordingly are written in memory 29 with reference to the positions of writing tip 12 detected by tablet 4 (i.e., bit data "1" are written), and a gap between adjacent patterns is interpolated. For this reason, the width of trace B displayed on display device 3 is gradually increased. If the width of trace B reaches a predetermined width (if the largest pattern is selected), control is looped through steps S1, S2, S4, S5, and S6, and the width of trace B cannot be changed.

Figure 8:
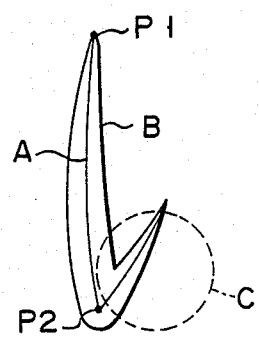
FIG. 8 is a representation showing the relationship among a pen trace, writing pressure, and a displayed image.

If the writing pressure is less than a predetermined value, switch 14 is turned off. Control selects the patterns whose sizes are gradually decreased, and writes the selected pattern in memory 29, through steps S1, S2, S3, S9, S10, S5, and S6. For this reason, the linewidth of curve B displayed on display device 3 is gradually decreased. If the displayed curve reaches "0" (no trace is displayed), it can no longer be changed. Control continuously selects the smallest pattern, through steps S1, S2, S3, S5, and S6, and no data is written in memory 29. The rate of increase or decrease in the width of a displayed line varies in accordance with the moving speed of pen 1, as is shown in FIG. 7B. Therefore, if pen 1 is moved along line A so that switch 14 is turned on at point P1 and is turned off a point P2, a hook-shape serif (hane), indicated by C in FIG. 8, of a letter as written by a Chinese writing brush, as shown in FIG. 8, can be displayed.

Figure 9:
FIG. 9 is a representation showing an example of an image displayed by the apparatus according to the embodiment of the present invention.

FIG. 9 shows an example of a letter displayed by the apparatus.

Figure 4:
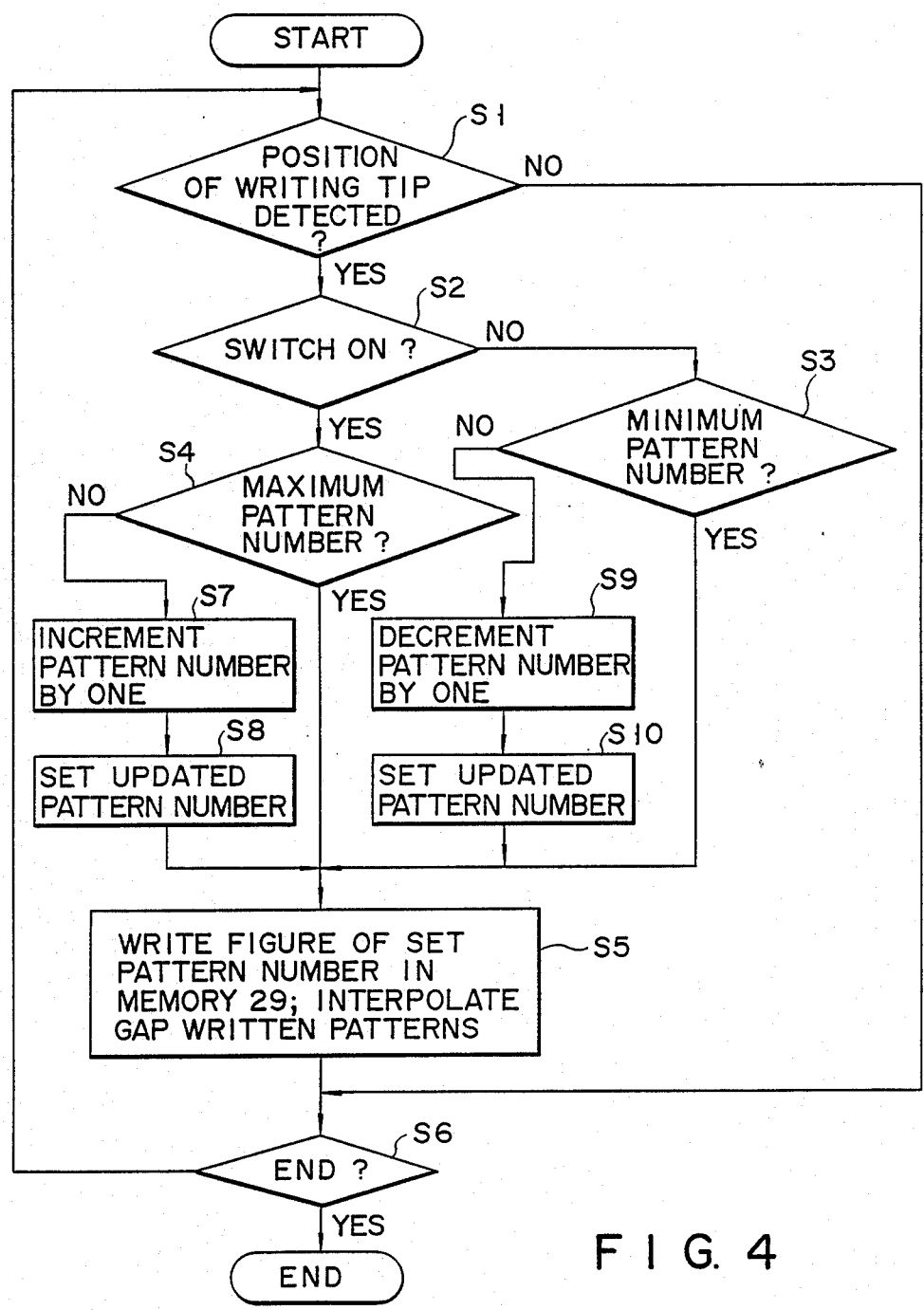
FIG. 4 is a flow chart for explaining the operation of the handwritten-image input apparatus shown in FIGS. 1 to 3.

The operation of the apparatus according to the present invention is not limited to the flow chart shown in FIG. 4. In the above embodiment, a predetermined pattern is selected and is written in a bit map memory. However, for example, a width of a displayed line can be directly increased or decreased.

Figure 5:
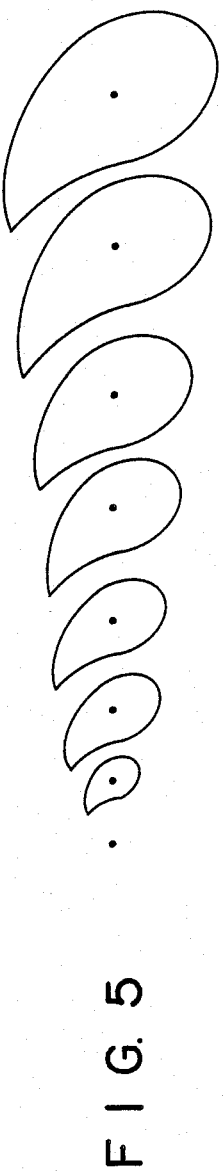
FIG. 5 is a representation showing an example of patterns stored in an image memory.

The patterns shown in FIG. 5 are basic patterns when letters are written by a Chinese writing brush. For this reason, with these patterns, letters resembling those written by the Chinese writing brush can be displayed. However, patterns are not limited to those shown in FIG. 5.

A method for interpolating adjacent patterns written in memory 29 is not limited to the method shown in FIGS. 6A and 6B. Various other known interpolating methods can be employed. For the sake of easy understanding, a given pattern and a next written pattern are separated from each other by a considerable distance in FIGS. 6A and 6B. However, if a cycle for causing tablet 4 to detect the position of writing tip 12 is shortened, and the number of variations in the sizes of the patterns is increased, interpolation need not always be performed, as is shown in FIG. 6C. With this arrangement, the line width of a letter can be continuously changed, and a letter resembling a pattern written by a Chinese writing brush or the like can be displayed more closely.

The present invention is not limited to the input apparatus for the display device, and can be applied to an output apparatus such as a printer and the like.

What is claimed is:

1. A handwritten-image input apparatus comprising:
   pen means;
   tablet means for detecting a position of said pen means;
   pressure-detecting means for detecting whether a pressure applied to said pen means exceeds a predetermined value; and
   trace information-generating means, which receives information from said tablet means, indicating the position of said pen means, an information, supplied from said pressure-detecting means, indicating a pressure applied to said pen means, and generates trace information for outputting a trace of movement of said pen means, the trace information including line-width information indicating a width of a trace made by said pen means, said trace information-generating means changing the line-width information so as to increase an output line width of the trace made by said pen means over a period of time while the pressure applied to said pen means is greater than the predetermined value, and changing the line-width information so as to decrease an output line width of the trace made by said pen means over a period of time while the pressure applied to said pen means is less than the predetermined value.

2. An apparatus according to claim 1, wherein said pen means has a writing tip for contacting said tablet means, and
said pressure-detecting means comprises a switch which is turned on-off by a pressure applied to said writing tip.

3. An apparatus according to claim 1, wherein said apparatus further comprises:
storage means for storing the trace information; and
means, connected to said storage means, for displaying the trace made by said pen means on said tablet means, and in a format corresponding to the storage content of said means.

4. An apparatus according to claim 3, wherein said tablet means comprises a transparent tablet panel, said tablet means and said display means are stacked, and said display means displays an image of trace of said per means n said tablet means overlapped with the actual trace of said pen means.

5. An apparatus according to claim 1, wherein said trace information-generating means further comprises:
a bit map memory for storing the trace information, and means for storing a plurality of patterns having different sizes;
means for storing a plurality of patterns having different sizes;
said trace information-generating means comprises means for writing one of said plurality of patterns at a location of said bit map memory, which corresponds to the position of said pen means detected by said tablet means, said trace information-generating means sequentially selecting larger patterns and storing them in said bit map memory when said pressure-detecting means detects that the pressure applied to said pen means is greater than the predetermined value, and said trace information-generating means sequentially selecting smaller patterns and storing them in said bit map memory when said pressure-detecting means detects that the pressure applied to said pen means is less than the predetermined value; and
said display means accesses said bit map memory to perform a display.

6. An apparatus according to claim 5, wherein
after the largest pattern is selected, said trace information-generating means selects the largest pattern while said pressure-detecting means detects whether the pressure applied to said pen means is greater than the predetermined value, and after the smallest pattern is selected, said trace information-generating means writes no data in said bit map memory while said pressure detecting means detects whether the pressure applied to said pen means is less than the predetermined value.

7. An apparatus according to claim 1, wherein
said pen means has a writing tip for contacting said tablet means;
said pressure-detecting means comprises a switch which is turned on/off by a pressure applied to said writing tip of said pen means;
said apparatus further comprises:
means for storing display information, and
means, connected to said storage means, for displaying the trace made by said pen means on said tablet means, and in a format corresponding to the storage content of said means; and
said trace information-generating means has a function for limiting a further increase in line width when the line width reaches a predetermined value.

8. An apparatus according to claim 1, wherein
said pen means has a writing tip for contacting said tablet means;
said pressure-detecting means comprises a switch which is turned on/off by a pressure applied to said writing tip of said pen means;
said trace information generating means further comprises:
a bit map memory for storing the trace information, and
means for storing a plurality of patterns having different sizes;
said trace information-generating means comprises means for writing one of said plurality of patterns at a location of said bit map memory, which corresponds to the position of said pen means detected by said tablet means, said trace information-generating means, sequentially selecting larger patterns and storing them in said bit map memory when said pressure-detecting means detects that the pressure applied to said pen means is greater than the predetermined value, and said trace information-generating means sequentially selecting smaller patterns and storing them in said bit map memory when said pressure-detecting means detects that the pressure applied to said pen means is less than the predetermined value; and said apparatus further comprises a display device for accessing said bit map memory to perform a display.

9. A handwritten-image display apparatus comprising:

pen means;

tablet means for detecting a position of said pen means;

display means for displaying a trace made by said pen means on said tablet means;

pressure-detecting means for detecting whether a pressure applied to said pen means exceeds a predetermined value; and control means for increasing a line width of the trace of said pen means over a period of time, displayed on said display means, while the pressure applied to said pen means is greater than the predetermined value, and for decreasing the line width of the trace of said pen means over a period of time, displayed on said display means, while the pressure applied to said pen means is less than the predetermined value.

10. An apparatus according to claim 9, wherein said pen means has a writing tip for contacting said tablet means, and said pressure-detecting means comprises a switch which is turned on/off by a pressure applied to said writing tip of said pen means.

11. An apparatus according to claim 9, wherein said control means has a function for limiting a further increase in line width when the line width of the displayed trace reaches a predetermined value.

12. An apparatus according to claim 9, wherein said control means further comprises:

a bit map memory for storing data, means for storing a plurality of patterns having different sizes, and writing means which writes one of said plurality of patterns at a location of said bit map memory which corresponds to the position of said pen means detected by said tablet means, said writing means sequentially selecting larger patterns and writing the selected patterns in said bit map memory when said pressure-detecting means detects that the pressure applied to said pen means is greater than the predetermined value, said writing means sequentially selecting smaller patterns and writing the selected patterns in said bit map memory when said pressure-detecting means detects that the pressure applied to said pen means is less than the predetermined value; and said display means accesses said bit map memory to perform a predetermined display.

13. An apparatus according to claim 9, wherein said tablet means comprises a transparent tablet panel, said tablet means and said display means are stacked, and said display means displays an image of trace of said pen means on said tablet means overlapped with the actual trace of said pen means.

* * * * *